United States Patent
Han et al.

(10) Patent No.: US 8,953,528 B2
(45) Date of Patent: Feb. 10, 2015

(54) APPARATUS AND METHOD FOR AMBIENT NOISE ADAPTATION IN WIRELESS SENSOR NETWORKS

(75) Inventors: Seokman Paul Han, Rancho Cordova, CA (US); Rituparna Ghosh, Folsom, CA (US); Raju Pandey, Davis, CA (US)

(73) Assignee: SynapSense Corporation, Folsom, CA (US)

(*) Notice: Subject to any disclaimer, the term of this patent is extended or adjusted under 35 U.S.C. 154(b) by 972 days.

(21) Appl. No.: 12/802,296

(22) Filed: Jun. 2, 2010

(65) Prior Publication Data

US 2010/0316009 A1 Dec. 16, 2010

Related U.S. Application Data

(60) Provisional application No. 61/268,719, filed on Jun. 15, 2009.

(51) Int. Cl.
*H04W 4/00* (2009.01)
*H04L 12/413* (2006.01)
(Continued)

(52) U.S. Cl.
CPC ............ *H04W 72/082* (2013.01); *H04L 43/04* (2013.01); *H04L 43/16* (2013.01); *H04L 43/024* (2013.01); *H04W 28/048* (2013.01); *H04W 52/0264* (2013.01); *H04W 52/0261* (2013.01)
USPC ........... 370/329; 370/445; 370/446; 370/447; 370/448; 370/449; 370/450; 370/451; 370/452; 370/453; 370/454; 370/455; 370/456; 370/457; 370/458; 370/459; 370/460; 370/461; 370/462; 370/463

(58) Field of Classification Search
CPC ....... H04L 43/024; H04L 43/04; H04L 43/16; H04W 28/048; H04W 52/0261; H04W 52/0264
See application file for complete search history.

(56) References Cited

U.S. PATENT DOCUMENTS 5,194,848 A * 3/1993 Kerr .............................. 340/566
5,379,290 A 1/1995 Kleijne
(Continued)

FOREIGN PATENT DOCUMENTS

CA 2616715 2/2007
CN 101401480 4/2009
(Continued)

OTHER PUBLICATIONS

International Preliminary Report on Patentability (PCT/US2010/001614), Dec. 16, 2011.
(Continued)

*Primary Examiner* — Hassan Phillips
*Assistant Examiner* — Lonnie Sweet
(74) *Attorney, Agent, or Firm* — Inventive Patent Law P.C.; Jim H. Salter

(57) ABSTRACT

Various embodiments provide an apparatus and method for adapting wireless sensor network device operation to ambient RF noise. An example embodiment includes: initializing a noise threshold value to a default value; detecting an ambient RF noise level on a plurality of channels of a wireless network device; if the ambient RF noise level detected on a pre-determined number of channels is above the noise threshold value, adjusting the noise threshold value by an increment and retesting the ambient RF noise level on the plurality of channels; if the noise threshold value exceeds a pre-determined maximum noise threshold value, suspending data communications by the wireless network device; and if the ambient RF noise level detected on a pre-determined number of channels is below the noise threshold value, retaining the noise threshold value and enabling data communications by the wireless network device.

23 Claims, 5 Drawing Sheets

(51) Int. Cl.
*H04L 12/42* (2006.01)
*H04L 12/403* (2006.01)
*H04L 12/43* (2006.01)
*H04J 3/02* (2006.01)
*H04L 12/66* (2006.01)
*H04W 72/08* (2009.01)
*H04L 12/26* (2006.01)
*H04W 28/04* (2009.01)
*H04W 52/02* (2009.01)

(56) References Cited

U.S. PATENT DOCUMENTS

| | | | |
|---|---|---|---|
| 5,515,369 | A | 5/1996 | Flammer et al. |
| 6,480,497 | B1 | 11/2002 | Flammer et al. |
| 6,590,928 | B1 | 7/2003 | Haartsen |
| 6,856,591 | B1 | 2/2005 | Ma et al. |
| 7,031,329 | B2 | 4/2006 | Lipsanen |
| 7,463,644 | B2 | 12/2008 | Zhu |
| 7,680,092 | B2 | 3/2010 | Van Laningham |
| 2005/0030968 | A1 | 2/2005 | Rich et al. |
| 2005/0074025 | A1 | 4/2005 | Shao et al. |
| 2005/0129051 | A1 | 6/2005 | Zhu |
| 2005/0239411 | A1 | 10/2005 | Hazra |
| 2006/0126501 | A1 | 6/2006 | Ramaswamy |
| 2006/0268791 | A1 | 11/2006 | Cheng |
| 2007/0116060 | A1 | 5/2007 | Qu |
| 2007/0258508 | A1 | 11/2007 | Werb et al. |
| 2007/0268880 | A1 * | 11/2007 | Bellur et al. ............... 370/338 |
| 2008/0019265 | A1 | 1/2008 | Alluisi et al. |
| 2008/0019302 | A1 | 1/2008 | Nagarajan et al. |
| 2008/0043707 | A1 | 2/2008 | Ren |
| 2008/0095222 | A1 | 4/2008 | Van Laningham |
| 2008/0151801 | A1 | 6/2008 | Mizuta |
| 2008/0174446 | A1 * | 7/2008 | Ghabra et al. ........... 340/825.01 |
| 2008/0298450 | A1 | 12/2008 | Zhang |
| 2009/0109992 | A1 | 4/2009 | Lurie et al. |
| 2010/0316009 | A1 | 12/2010 | Han |

FOREIGN PATENT DOCUMENTS

| | | |
|---|---|---|
| EP | 1719301 | 11/2006 |
| EP | 1911184 | 4/2009 |
| EP | 2443901 A2 | 4/2012 |
| JP | 2009504010 | 1/2009 |
| WO | WO2005083953 | 9/2005 |
| WO | WO2007015962 | 6/2007 |
| WO | WO2008021278 | 7/2008 |
| WO | WO2010147622 A2 | 12/2010 |
| WO | WO2010147622 A3 | 12/2010 |

OTHER PUBLICATIONS

PCT International Preliminary Report on Patentability, Intl. App. No. PCT/US2010/001614, Dec. 16, 2011.

Notification Concerning Transmittal of the PCT International Preliminary Report on Patentability, Intl. App. No. PCT/US2010/001614, Dec. 16, 2011.

* cited by examiner

APPARATUS AND METHOD FOR AMBIENT NOISE ADAPTATION IN WIRELESS SENSOR NETWORKS

PRIORITY PATENT APPLICATION

This is a non-provisional patent application claiming priority to U.S. provisional patent application Ser. No. 61/268,719; filed Jun. 15, 2009. This non-provisional patent application draws the priority benefit from the referenced provisional patent application. The entire disclosure of the referenced provisional patent application is considered part of the disclosure of the present application and is hereby incorporated by reference herein in its entirety.

TECHNICAL FIELD

The disclosed subject matter relates to the field of network communications, and more particularly to network routing and power management in mesh networks.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2009 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g., radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (i.e., the nodes are "plugged in" or externally powered) or from batteries in each node (i.e., the nodes are internally powered). Networks that employ a combination of externally powered nodes and internally powered nodes can be denoted hybrid networks. As the size, power, and cost of the computation and communication requirements of these devices have decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, particle counts, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensing device. Further, it is important to monitor the operational status of each of the sensing devices.

Given that many WSN devices are internally-powered (e.g., battery), the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on (activating the radio) only when devices need to send and/or receive data and efficiently managing the power output of the radios when they are on. The operational lifetime of the network, thus, depends on the ability to effectively manage the operation of the radios in the wireless network nodes.

The network devices in a WSN must efficiently manage the network topology so that network data packets are properly routed to their destination. In order to carry out this task, the WSN network devices must wake up periodically, activate their radios, and listen for a data communication from another network device to determine if any data packet needs to be routed. Most of the battery power in a wireless network device is consumed when the device must wake up more often, turn the radio on, and listen for a data communication from another network device. Thus, the process of data path maintenance and packet routing through wireless devices in a WSN needs to be highly efficient in order to extend the operational lifetime of the network.

Wireless sensor devices typically use a low power radio device to communicate with other network devices. In most cases, before a network device begins the radio transmission of any data packet, the network device senses the environment for radio frequency (RF) signals or noise to determine if there are other data packets being transmitted by other network devices or other RF sources in the environment. In the presence of excessive RF noise or transmission of RF packets by other network devices, the network device may back off (e.g., delay or cancel a wireless data transmission) for a small amount of time to avoid any data packet collisions. Later, the network device will then try to send the data packet again.

In certain environments, an ambient RF noise level exists on the entire RF spectrum on which the network devices of a WSN are attempting to wirelessly communicate. Further, the level of the ambient noise in the environment may change dynamically over time. In these environments, a network device may not be able to transfer any data via a radio transmission because of the disruptive nature of the ambient noise. In other cases, the network device may only be able to transfer data intermittently via a radio transmission. A system and method is needed that will allow wireless network devices to adapt to this ambient noise and operate efficiently.

U.S. Pat. No. 5,515,369 describes a technology for use in a wireless packet communication system having a plurality of nodes, each having a transmitter and a receiver, the receiver at each node is assigned a seed value and is provided with a channel punchout mask. A node uses its seed value and punchout mask to generate a specific randomly ordered channel hopping band plan on which to receive signals. A node transmits its seed value and punchout mask to target nodes with which it wants to establish communication links, and those target nodes each use the seed value and punchout mask to generate the randomly ordered channel hopping band plan for that node. Subsequently, when one of the target nodes wishes to transmit to the node, the target node changes frequency to the frequency of the node according to that node's band plan.

U.S. Pat. No. 6,590,928 describes a wireless network including master and slave units. The master sends a master address and clock to the slaves. Communication is by means of a virtual frequency hopping channel whose hopping sequence is a function of the master address, and whose phase is a function of the master clock. Transmitted inquiry messages solicit slave address and topology information from the slaves, which may be used to generate a configuration tree for determining a route for a connection between the master and slave units.

U.S. Pat. No. 6,480,497 describes a technology for use in a mesh network communication system, where net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

U.S. Patent Application No. 20070258508 describes a method and apparatus for communication in a wireless sensor network. In one embodiment, one or more routers in a network may be available for communication with one or more star nodes at a randomized time and/or frequency. A connectivity assessment, which may be performed at several different frequencies and/or times, may be performed to evaluate the quality of communications between devices in the network. Primary and secondary communication relationships may be formed between devices to provide for system redundancy. One or more proxies may be maintained where each proxy includes a status of one or more devices in the network, e.g., one or more star nodes or routers. Proxies may be used to handle information requests and/or status change requests, e.g., a proxy may be requested to change a communication relationship between devices in the network and may generate command signals to cause the corresponding devices to make the change.

Thus, an apparatus and method for adapting wireless sensor network device operation to ambient RF noise are needed.

BRIEF DESCRIPTION OF THE DRAWINGS

Embodiments illustrated by way of example and not limitation in the figures of the accompanying drawings, in which.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for adapting wireless sensor network device operation to ambient RF noise. A particular embodiment relates to wireless data networks and more particularly to a multiple-hop wireless data communications employing a packet-switched time-sharing communications protocol. A particular embodiment has application to data collection from an array of sensors disposed in a network topology wherein at least two intelligent communication nodes are within reliable radio communication range within an array of peer communication nodes. The various embodiments of an example system and method described herein present an adaptive approach for managing data communications in wireless sensor networks experiencing varying levels of RF ambient noise in the environment in which the wireless network devices are operating.

In a particular embodiment described herein, wireless network devices (e.g., wireless, internally-powered, network sensor devices) are enabled to continue to operate and transmit/receive data even under circumstances in which network device data communications may be experiencing a disruptive level of ambient RF noise. In a particular example embodiment described herein, a wireless sensor network allows different wireless network devices to adapt to pervasive RF noise in their environment. The particular example embodiment seamlessly enables wireless sensor network devices to: 1) determine if they can operate in a noisy environment; 2) adapt their sensitivity level to a specific noise level; and 3) modify the sensitivity level for the network device as the noise characteristics change over time. The network and node configuration in a particular embodiment are described in more detail below.

Figure 1:
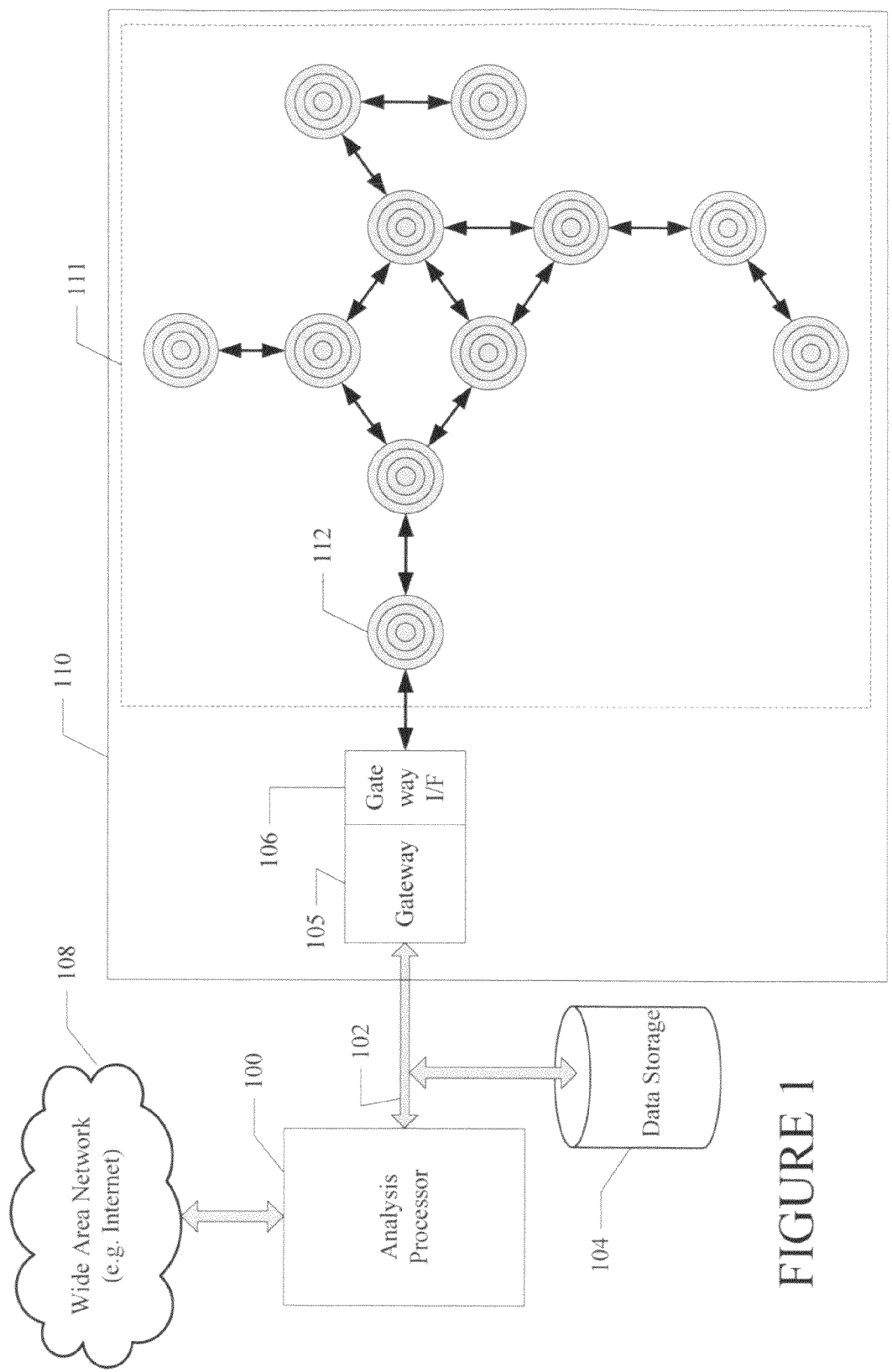
FIG. 1 illustrates a mesh data network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 and a gateway device 105 (collectively denoted nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node has a unique identifier. A data packet or message is a self-contained unit of transmitted information. Typically, a data packet has a header, a payload, and an optional trailer. A link is a path which originates at one node and terminates at one other node. A link or path between nodes may include multiple hops between, a plurality of intermediate nodes prior to reaching a destination node. The transfer of messages between two nodes of WSN 110 in a unicast or broadcast transmission is termed a local communication. Each of the nodes in the WSN 110 can maintain a neighborhood table that defines the set of nodes that are one hop away from a given node.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the other nodes of WSN 110 can obtain access to the Internet.

Gateway 105 can also provide synchronization timing for the nodes 112 of WSN 110. Gateway 105 can send periodic messages (also denoted as beacons or heartbeats) to each of the nodes 112 of WSN 110. Alternatively, any of the nodes 112 of WSN 110 can be designated to send the beacon to other nodes on the network. These periodic messages can include a timing signal to which each of the nodes 112 can synchronize their internal timers. Similarly, messages from gateway 105 to each of the nodes 112 can be used to provide system status, configuration, and control settings for the nodes of WSN 110. In an alternative embodiment, any of the nodes of the network or an agent may provide a network management message including the synchronization (timing) signal for the other network nodes. Alternatively, an external signal source may be used as a basis for the time synchronization of network nodes. Using any of the techniques described above, a common global clock can be provided for time synchronization of network nodes. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes of WSN 110 includes functionality to join or reconfigure itself in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g., radios) within each node of WSN 110 and the nature of the ambient RF noise in the environment, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
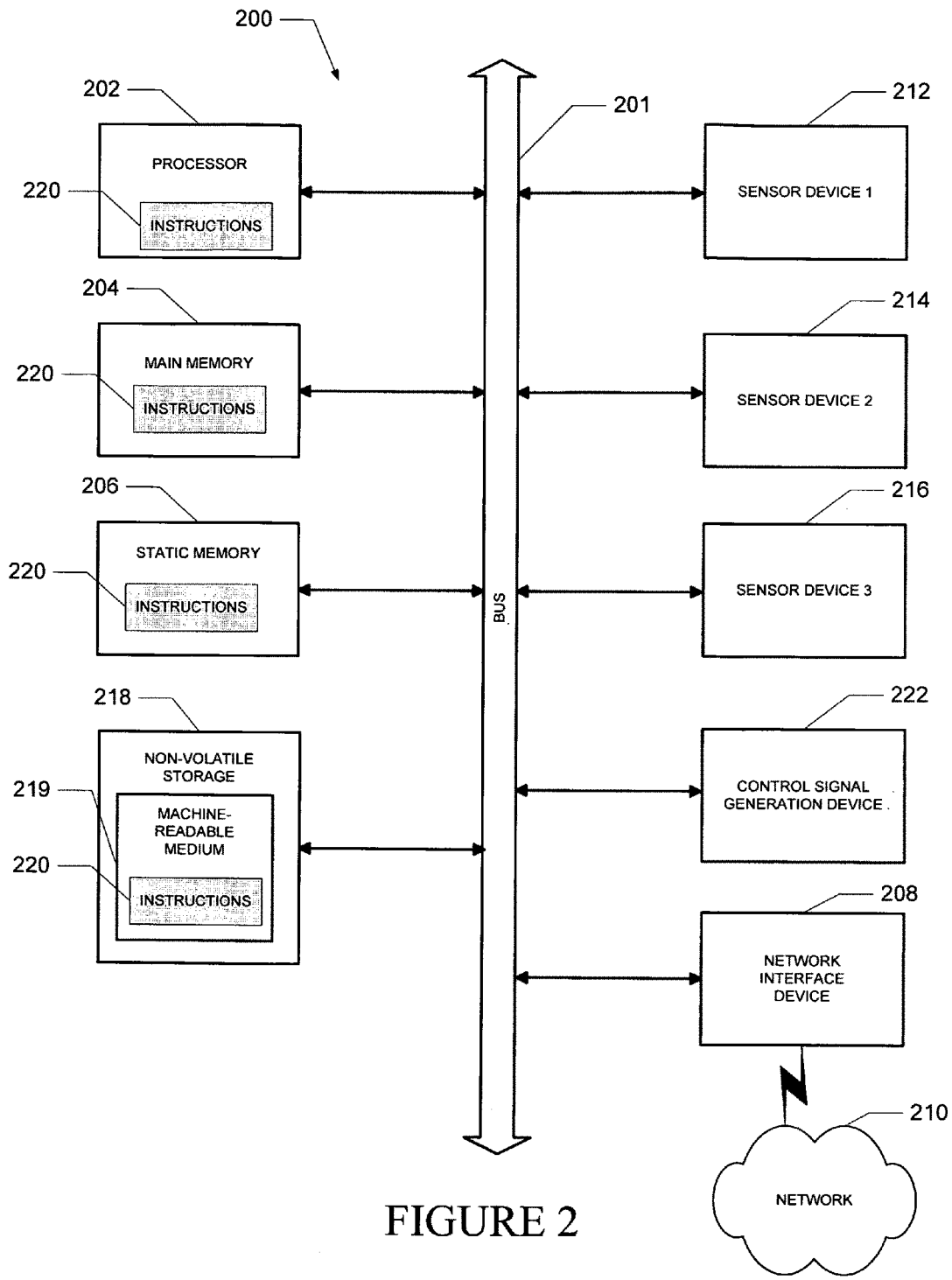
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 of a particular embodiment includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, particle counters, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for determining, detecting and/or measuring a desired circumstance or exceptional condition within an environmental or other management system, process control system, building management system, or the like.

The node 200 may further include a non-volatile memory 218, a control signal generation device 222, and a network interface device 208 (e.g., a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g., radios) in the network nodes consume the most electrical power and represent the largest drain on the node's battery power. As such, the radio should be turned off (de-activated) for most of the time to increase the battery lifetime of the nodes. In an example embodiment, all nodes of WSN 110 are time synchronized. In order to conserve battery power, each node wakes up (i.e., activates its radio for network data communications) for a short period of time for radio communication with other nodes or the gateway. Then, the nodes radio is de-activated and the node sleeps (i.e., de-activates its radio to conserve battery power) until the next scheduled communication cycle.

In a particular example embodiment described herein, an apparatus and method is described for adapting wireless sensor network device operation to ambient RF noise. The method and system of a particular embodiment seamlessly enable wireless sensor network devices to continue to operate and transfer data even under conditions in which an environment has a varying level of ambient RF noise.

Figure 3:
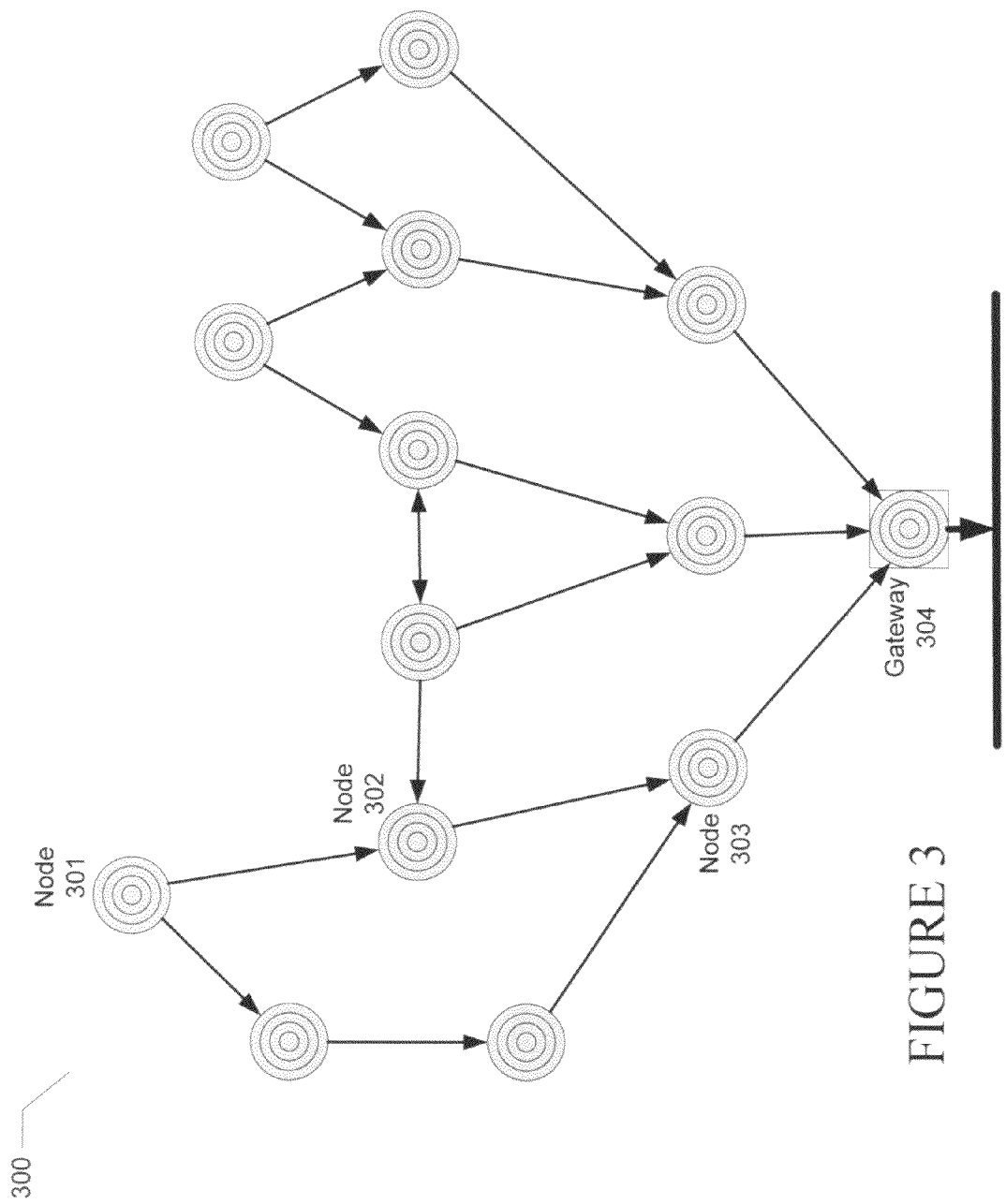
FIG. 3 illustrates an example of a configuration of network devices in a mesh network of an example embodiment.

Referring now to FIG. 3, an example of a configuration of network devices in a mesh network of an example embodiment is illustrated. In the normal condition of a wireless mesh network as described above, network devices can inter-communicate to form a wireless mesh network, synchronize with each other using a common global clock, and transfer data to/from a gateway and/or other network devices. For example, as shown in FIG. 3, an example wireless data network 300 is shown. In wireless network 300, network devices (nodes) 301, 302 and 303 can be synchronized to the common global clock. These nodes, and others of the nodes in wireless network 300, can route data from a source node towards a gateway node 304. These nodes of wireless network 300 normally operate in one of two modes: 1) a low power listening (LPL) mode, and 2) a data transfer mode. In the low power listening mode, the nodes sleep (i.e., de-activate their radio to conserve battery power) most of the time. In a data transfer mode, a node can wake up (i.e., activate its radio for network data communications) and begin a network data transmission or network monitoring activity. According to a pre-configured wake-up schedule adopted by each of the nodes during an initialization phase, the nodes of network 300 can synchronize their wake-up cycles so that a transmitting node can wake up at the same time a receiving node is awake. This synchronization between nodes is critical for data communication between nodes. The synchronization is based on the common global clock, which is used to calibrate the internal clocks within each node. Network devices can manage their synchronization to global time by mapping a local time reading from the network device resident hardware clocks to the reference common global time value. If the timing synchronization between nodes is operating properly, or with a pre-defined tolerance (i.e., the timing drift between node clocks is within tolerance), data communications between nodes can be accomplished in a normal and efficient manner.

Carrier Sense Threshold

Most RF radios in wireless sensor network devices support a programmable threshold, called a carrier sense threshold. This threshold or threshold parameter is used to quantify the level of ambient RF noise on any given radio channel defined by a frequency band. The actual level of ambient RF noise at any given moment in time can be measured using well known methods. A radio uses the carrier sense threshold to determine if there is a disruptive level of RF noise in the environment and to quantify the level of RF noise detected. In most cases, before a network device begins the radio transmission of any data packet, the network device senses the environment using well known methods to detect spurious RF signals or noise or to determine if there are other data packets being transmitted by other network devices or other RF sources in the environment. In the presence of excessive RF noise or the transmission of RF packets by other network devices, the network device may back off (e.g., delay or cancel a wireless data transmission) for a small amount of time to avoid any data packet collisions. Later, the network device can try to send the data packet again. The following process describes this behavior of typical network devices and the use of the carrier sense threshold (denoted below as the 'MaximumNoiseThreshold'):

```
while (true)
    MaximumNoiseThreshold = fixed value
    ...
    currentNoise = radio.read_current_noise_level( );
    if currentNoise > MaximumNoiseThreshold
        backoff(/don't send data/);
        sleep(fixed amount of time);
    else
        send data
end
```

Noise Level Adaptation

One problem with the method for carrier sense thresholding described above is that the carrier sense threshold is a fixed value determined typically at system configuration or initialization time. As such, the conventional use of the carrier sense threshold cannot adapt to changing or variable conditions in the environment in which a particular WSN is operating. Therefore, data communications in the conventional WSN can be prone to inefficiencies in environments with changing or variable levels of RF noise.

In the various embodiments described herein, RF noise level adaptation is used to initially configure the carrier sense threshold of a network device for the conditions in a particular environment and to periodically adapt the network device as environmental conditions change over time. Thus, in a particular embodiment, two basic operations are used to accomplish RF noise level adaptation: 1) Dynamically change the carrier sense threshold initially in a wireless network device to suit current noise conditions, and 2) Adapt the wireless network device periodically for current noise conditions over time as RF noise characteristics change. These two basic operations in an example embodiment are described in more detail below.

Noise Level Adaptation—Initialization

In a first operation of an example embodiment, a wireless network device starts by setting a minimum radio noise threshold (e.g., LowerBoundNoiseThreshold) and a maximum noise threshold (e.g., UpperBoundNoiseThreshold) to pre-determined initial default values. The minimum radio noise threshold highlights the expectations about RF noise in a normal environment. The maximum radio noise threshold highlights the operational limits of the radio: the larger the radio noise threshold, the smaller is the reach of the radio. However, the smaller reach of the radio also indicates that less power can be consumed by the wireless network device when the radio noise threshold is large. Thus, it would be beneficial to initialize each wireless network device with a radio noise threshold that is as large as possible while ensuring that the wireless network device can still communicate on a pre-determined minimum number of channels. The initialization phase of the noise level adaptation of a particular embodiment accomplishes the task of determining an efficient balance between the power output of the radio and the ability to communicate on a pre-determined minimum number of channels.

During the initialization phase, the wireless network device probes each wireless network communication channel for a fixed number of times. If the wireless network device detects that the RF noise level on a pre-determined number of channels is above a certain threshold, the wireless network device raises its noise threshold by an increment (e.g., a fixed increment of 1 db). The wireless network device repeats this process until the wireless network device finds a noise threshold where at least a minimum required number of channels are free. A channel is free if the detected ambient RF noise on the channel is not disruptive to data communications on the channel. If the noise threshold being tested exceeds the maximum radio threshold, and a minimum required number of channels are not free, the wireless network device will stop trying to send data. The process used in a particular example embodiment is detailed below:

```
LowerBoundNoiseThreshold = <a value>
UpperBoundNoiseThreshold = <a value>
RequiredChannels = [list of channels that must be clear]
LeastNumberOfFreeChannels = <a value>
currentRadioSenseThreshold = LowerBoundNoiseThreshold
    while (currentNoiseLevel < UpperBoundNoiseThreshold)
        numOfFreeChannels = 0
        for channels in requiredChannels
            radio.set_noise_threshold(currentRadioSenseThreshold)
            currentNoise = radio.read_current_noise_level( );
            if currentNoise < currentRadioSenseThreshold
                numOfFreeChannels ++;
            end if
        end
        if (numberofFreeChannels < LeastNumberOfFreeChannels)
            increment(currentRadioSenseThreshold)
            continue;
        else
            // found right threshold; exit
            break;
    end while
```

Noise Level Adaptation—Periodic Evaluation

The RF noise characteristics may change over time. The wireless network devices need to periodically evaluate the environment and adapt their noise threshold to match existing conditions. In a particular embodiment, each wireless network device in a WSN checks the utilization of each channel at a pre-determined interval (e.g., every t minutes). If the channel utilization is beyond a certain threshold, the wireless network device runs the noise level adaptation initialization phase (described above) again to readjust the noise threshold in the wireless network device. The process used in a particular example embodiment is detailed below:

```
NumOfOpenChannels = <value>
ChannelUtlizationThreshold = <value>
ReviseNoiseThresholdPeriod = <value>
ChannelUtilization = [set 0 for each channel]
every ReviseNoiseThresholdPeriod minutes do
    numOfOpenChannels = 0;
    for channels in requiredChannels
        evaluate utilization of channel
        if (utilization > ChannelUtilizationThreshold)
            numOfOpenChannels ++;
        end if
    end
    if (numberofOpenChannels >= ChannelUtilizationThreshold)
        re-evaluate noise threshold( )
    end if
end every
```

Figure 4:
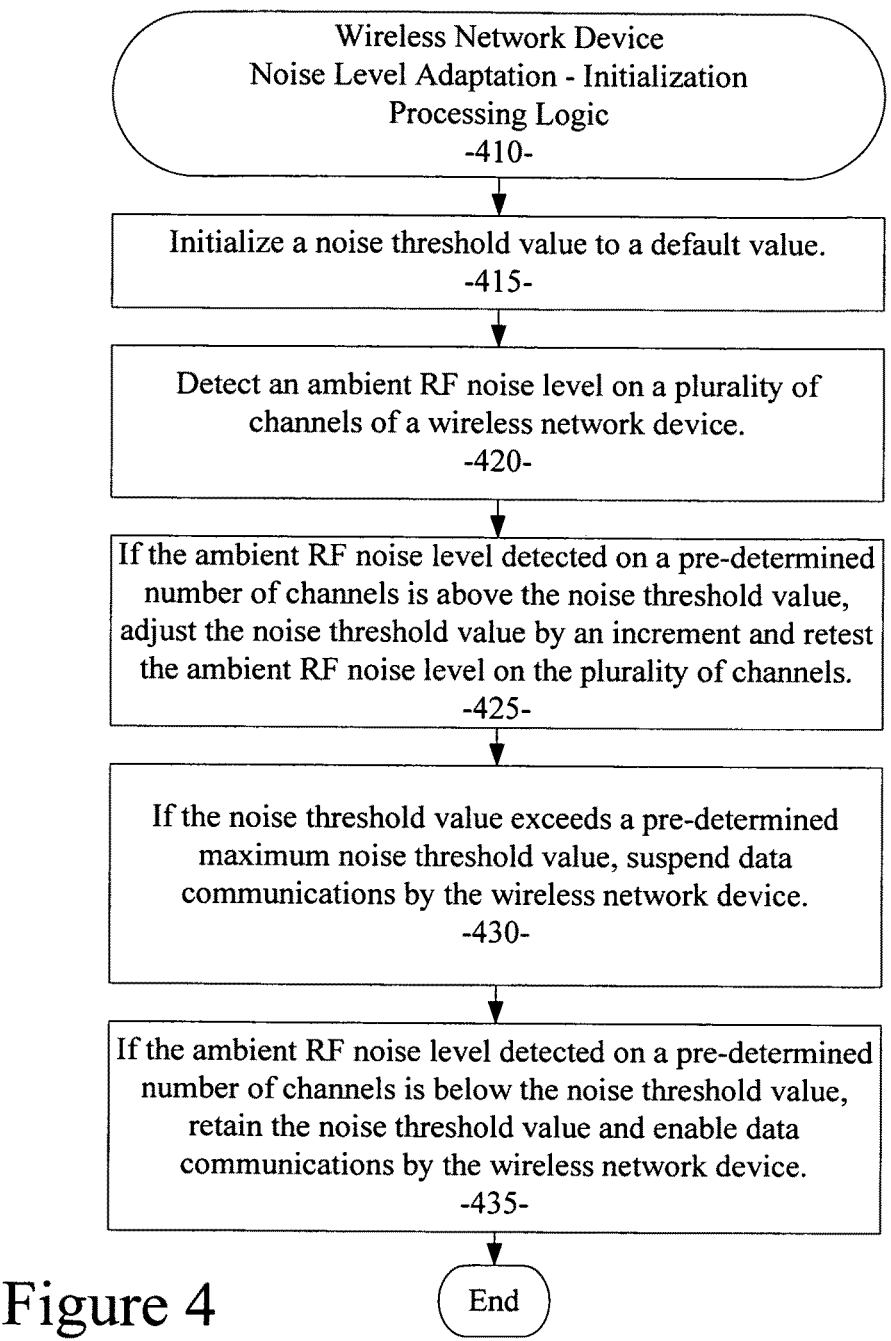
FIGS. 4-5 are flow diagrams illustrating the processing flow for particular example embodiments.

FIG. 4 is a processing flow diagram illustrating the basic processing flow 410 for a particular embodiment. As shown, an example embodiment includes: initializing a noise threshold value to a default value (processing block 415); detecting an ambient RF noise level on a plurality of channels of a wireless network device (processing block 420); if the ambient RF noise level detected on a pre-determined number of channels is above the noise threshold value, adjusting the noise threshold value by an increment and retesting the ambient RF noise level on the plurality of channels (processing block 425); if the noise threshold value exceeds a pre-determined maximum noise threshold value, suspending data communications by the wireless network device (processing block 430); and if the ambient RF noise level detected on a pre-determined number of channels is below the noise threshold value, retaining the noise threshold value and enabling data communications by the wireless network device (processing block 435).

Figure 5:
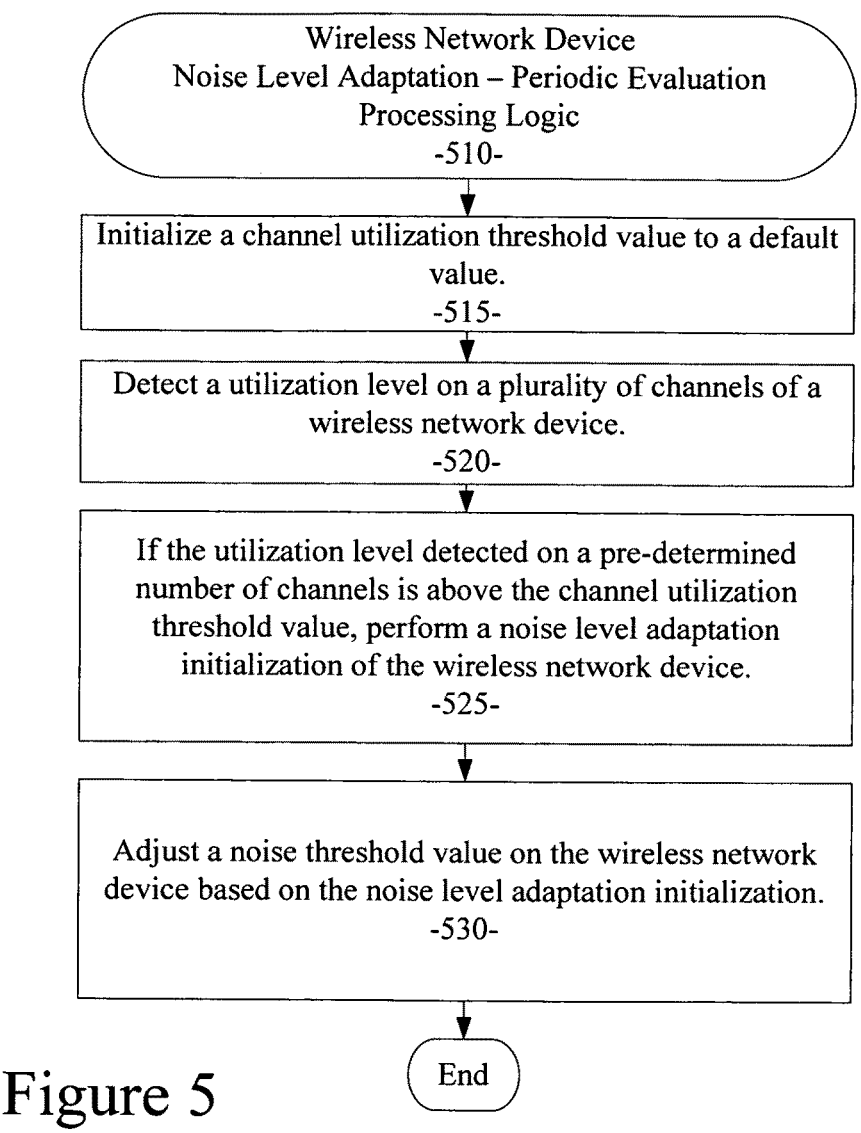

FIG. 5 is a processing flow diagram illustrating the basic processing flow 510 for a particular embodiment. As shown, an example embodiment includes: initializing a channel utilization threshold value to a default value (processing block 515); detecting a utilization level on a plurality of channels of a wireless network device (processing block 520); if the utilization level detected on a pre-determined number of channels is above the channel utilization threshold value, performing a noise level adaptation initialization of the wireless network device (processing block 525); and adjusting a noise threshold value on the wireless network device based on the noise level adaptation initialization (processing block 530).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic- or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module"

should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described herein, an apparatus and method for adapting wireless sensor network device operation to ambient RF noise are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
    initializing a noise threshold value to a default value;
    detecting an ambient radio frequency (RF) noise level on a plurality of channels of a wireless network device by execution of processing instructions by a processor in the wireless network device, the wireless network device being configured to communicate with other wireless network devices of a wireless sensor network at the data link layer of the Open Systems Interconnection (OSI) networking model using established data communication protocols, the wireless network devices of the wireless sensor network being synchronized to a common global clock and operating in a low power listening mode with radios de-activated to conserve battery power when the wireless network device is not transmitting data to other wireless network devices of the wireless sensor network;
    if the ambient RF noise level detected on a pre-determined number of channels is above the noise threshold value, adjusting the noise threshold value by an increment and retesting the ambient RF noise level on the plurality of channels;
    if the noise threshold value exceeds a pre-determined maximum noise threshold value, suspending data communications by the wireless network device; and
    if the ambient RF noise level detected on a pre-determined number of channels is below the noise threshold value, retaining the noise threshold value and enabling data communications by the wireless network device.

2. The method as claimed in claim 1 including detecting a utilization level on the plurality of channels of the wireless network device.

3. The method as claimed in claim 1 including detecting a utilization level on the plurality of channels of the wireless network device, and if the utilization level detected on a pre-determined number of channels is above a channel utilization threshold value, performing a noise level adaptation initialization of the wireless network device.

4. The method as claimed in claim 1 wherein the wireless network device includes at least one sensor for sensing an environmental condition.

5. The method as claimed in claim 1 wherein the wireless network device is in wireless data communication with at least one other wireless network device of the wireless sensor network.

6. A wireless network node comprising:
    a processor;
    a wireless network interface, coupled to the processor, to communicate with other nodes of a wireless sensor network, the wireless network node being configured to communicate with other wireless network nodes of the wireless sensor network at the data link layer of the Open Systems Interconnection (OSI) networking model using established data communication protocols, the wireless network nodes of the wireless sensor network being synchronized to a common global clock and operating in a low power listening mode with radios de-activated to conserve battery power when the wireless network node is not transmitting data to other wireless network nodes of the wireless sensor network;

a radio for data communications via the wireless network interface; and processing logic, executable by the processor, to initialize a noise threshold value to a default value, detect an ambient radio frequency (RF) noise level on a plurality of channels of the wireless network node, if the ambient RF noise level detected on a pre-determined number of channels is above the noise threshold value, adjust the noise threshold value by an increment and retest the ambient RF noise level on the plurality of channels, if the noise threshold value exceeds a pre-determined maximum noise threshold value, suspend data communications by the wireless network node, and if the ambient RF noise level detected on a pre-determined number of channels is below the noise threshold value, retain the noise threshold value and enable data communications by the wireless network node.

7. The wireless network node as claimed in claim 6 being further configured to detect a utilization level on the plurality of channels of the wireless network node.

8. The wireless network node as claimed in claim 6 being further configured to detect a utilization level on the plurality of channels of the wireless network node, and if the utilization level detected on a pre-determined number of channels is above a channel utilization threshold value, perform a noise level adaptation initialization of the wireless network node.

9. The wireless network node as claimed in claim 6 wherein the wireless network node includes at least one sensor to sense an environmental condition.

10. The wireless network node as claimed in claim 6 wherein the wireless network node is in wireless data communication with at least one other wireless network node of the wireless sensor network.

11. A wireless sensor network comprising:

a gateway;

a first wireless network node in data communication with the gateway, the first wireless network node being configured to communicate with other wireless network nodes of the wireless sensor network at the data link layer of the Open Systems Interconnection (OSI) networking model using established data communication protocols, the wireless network nodes of the wireless sensor network being synchronized to a common global clock and operating in a low power listening mode with radios de-activated to conserve battery power when the wireless network node is not transmitting data to other wireless network nodes of the wireless sensor network; and a second wireless network node being configured to communicate with other wireless network nodes of the wireless sensor network at the data link layer of the OSI networking model using established data communication protocols, the second wireless network node including processing logic to initialize a noise threshold value to a default value, detect an ambient radio frequency (RF) noise level on a plurality of channels of the second wireless network node, if the ambient RF noise level detected on a pre-determined number of channels is above the noise threshold value, adjust the noise threshold value by an increment and retest the ambient RF noise level on the plurality of channels, if the noise threshold value exceeds a pre-determined maximum noise threshold value, suspend data communications by the second wireless network node, and if the ambient RF noise level detected on a pre-determined number of channels is below the noise threshold value, retain the noise threshold value and enable data communications by the second wireless network node.

12. The wireless sensor network as claimed in claim 11 wherein the second wireless network node being further configured to detect a utilization level on the plurality of channels of the second wireless network node.

13. The wireless sensor network as claimed in claim 11 wherein the second wireless network node being further configured to detect a utilization level on the plurality of channels of the second wireless network node, and if the utilization level detected on a pre-determined number of channels is above a channel utilization threshold value, perform a noise level adaptation initialization of the second wireless network node.

14. The wireless sensor network as claimed in claim 11 wherein the second wireless network node being further configured to include at least one sensor to sense an environmental condition.

15. The wireless sensor network as claimed in claim 11 wherein the second wireless network node is in wireless data communication with at least one other wireless network node of the wireless sensor network.

16. An article of manufacture comprising a non-transitory machine-readable storage medium having machine executable instructions embedded thereon, which when executed by a machine, cause the machine to:

initialize a noise threshold value to a default value, detect an ambient radio frequency (RF) noise level on a plurality of channels of a wireless network device, the wireless network device being configured to communicate with other wireless network devices of a wireless sensor network at the data link layer of the Open Systems Interconnection (OSI) networking model using established data communication protocols, the wireless network devices of the wireless sensor network being synchronized to a common global clock and operating in a low power listening mode with radios de-activated to conserve battery power when the wireless network device is not transmitting data to other wireless network devices of the wireless sensor network, if the ambient RF noise level detected on a predetermined number of channels is above the noise threshold value, adjust the noise threshold value by an increment and retest the ambient RF noise level on the plurality of channels, if the noise threshold value exceeds a pre-determined maximum noise threshold value, suspend data communications by the wireless network device, and if the ambient RF noise level detected on a pre-determined number of channels is below the noise threshold value, retain the noise threshold value and enable data communications by the wireless network device.

17. The article of manufacture as claimed in claim 16 being further configured to detect a utilization level on the plurality of channels of the wireless network device.

18. The article of manufacture as claimed in claim 16 being further configured to detect a utilization level on the plurality of channels of the wireless network device, and if the utilization level detected on a pre-determined number of channels is above a channel utilization threshold value, perform a noise level adaptation initialization of the wireless network device.

19. The article of manufacture as claimed in claim 16 wherein the wireless network device includes at least one sensor to sense an environmental condition.

20. The article of manufacture as claimed in claim 16 wherein the wireless network device is in wireless data communication with at least one other wireless network device of the wireless sensor network.

21. A method comprising:
initializing a channel utilization threshold value to a default value;
detecting a utilization level on a plurality of channels of a wireless network device by execution of processing instructions by a processor in the wireless network device, the wireless network device being configured to communicate with other wireless network devices of a wireless sensor network at the data link layer of the Open Systems Interconnection (OSI) networking model using established data communication protocols, the wireless network devices of the wireless sensor network being synchronized to a common global clock and operating in a low power listening mode with radios de-activated to conserve battery power when the wireless network device is not transmitting data to other wireless network devices of the wireless sensor network;
if the utilization level detected on a pre-determined number of channels is above the channel utilization threshold value, performing a noise level adaptation initialization of the wireless network device; and
adjusting a noise threshold value on the wireless network device based on the noise level adaptation initialization.

22. The method as claimed in claim 21 wherein the wireless network device includes at least one sensor to sense an environmental condition.

23. The method as claimed in claim 21 wherein the wireless network device is in wireless data communication with at least one other wireless network device of the wireless sensor network.

* * * * *